ELECTRONIC SWITCHING NETWORK

Filed July 3, 1958 2 Sheets-Sheet 1

INVENTORS: L. W. HUSSEY
J. W. RIEKE
BY Alan C. Rose
ATTORNEY

Aug. 30, 1960 L. W. HUSSEY ET AL 2,951,124

ELECTRONIC SWITCHING NETWORK

Filed July 3, 1958

2 Sheets-Sheet 2

INVENTORS
L. W. HUSSEY
J. W. RIEKE
BY Alan C. Rose
ATTORNEY

United States Patent Office 2,951,124
Patented Aug. 30, 1960

2,951,124

ELECTRONIC SWITCHING NETWORK

Luther W. Hussey, Sparta, and John W. Rieke, Basking Ridge, N.J., assignors to Bell Telephone Laboratories, Incorporated, New York, N.Y., a corporation of New York Filed July 3, 1958, Ser. No. 746,350

24 Claims. (Cl. 179—18)

This invention relates to electronic communication systems and more particularly to switching networks of such systems.

In telephone central office communication systems an arrangement for permitting the interconnection of particular central office subscribers is required. In one arrangement for accomplishing this purpose, a switching circuit interconnects each line in a first group of lines with each line in a second group of lines. The switching network includes a series of stages between the two groups of lines, with each stage including a number of crosspoint switches or breakdown devices. The breakdown devices are interconnected at circuit nodes to provide many paths between each line in the first group and each line in the second group of lines. In electronic switching systems, the crosspoint switches are employed for establishing the path between lines as they are switched from their high impedance to their low impedance states. Following the establishment of connections through the network, each series of energized switches also constitutes a talking path through the network. In addition, crosstalk between different talking paths is prevented by the blocking action of bistable switches in their high impedance states.

One such system which employs gaseous discharge tubes for the principal network elements, or bistable switches, is disclosed in Patent 2,684,405 of E. Bruce et al., granted July 20, 1954. Networks have been disclosed which employ various types of semiconductor devices or circuits for the switching elements. Application Serial No. 717,216 of L. W. Hussey, filed February 24, 1958, and assigned to the assignee of this invention, discloses an electronic switching network using transistor circuits as the switches.

In the search for ever simpler and better devices for use as electronic switches in telephone switching networks, the PNPN semiconductor diode appears to fulfill many of the requirements. This device is described in "P–N–P–N Transistor Switches" by J. L. Moll et al., Proceedings of the I.R.E., volume 44, No. 9, page 1174. An electronic switching network utilizing semiconductor PNPN diodes as the switching components is described in application Serial No. 740,263 of E. A. Wooden, filed June 6, 1958.

In the past, it has been customary for electronic switching networks to employ the "end-marking" technique in establishing a connection. That is, "marks," or selection signals, are applied at the ends of a selected path. As successive bistable switches break down, these marks proceed toward the center of the network, where a match is provided. One problem which arises in such a network is related to the "fan-out" of the marks as a multitude of partial alternate paths are also set up. In an end-marked network of reasonable size, several hundred switches may be energized before a desired connection is established. The necessity for providing electronic switches near the ends of the network capable of supplying current to such a large number of switching elements creates severe component design requirements when switching circuits having fan-out are used.

It has become desirable to eliminate mark fan-out and to provide more individual control of the switches to be included in a particular connection by employing PNPN diodes in an internally marked network. Such a network is the subject of application Serial No. 746,351 of R. J. Andrews filed July 3, 1958, which describes an arrangement of PNPN diodes as crosspoint switches, with other PNPN diodes in shunt connection to network nodes. Signals are applied through the shunt-connected diodes to control the "priming," or preparation, of the circuit nodes in the selection of a path, thereby avoiding fan-out.

In the internally marked, or controlled, type of switching network, biasing and control circuits are both connected in shunt to the network nodes. Following the establishment of a talking path through a string of series-connected switches, these shunt paths tend to reduce the transmission quality of the circuit.

Accordingly, one object of the present invention is to improve the transmission characteristics of a switching network path while permitting increased margins in the design and production of components and circuitry for such a network.

A more general object of the invention is to improve electronic switching circuits for telephone communication systems.

A further object of the invention is to reduce the number of components required in an electronic switching network and achieve an attendant reduction in cost with an improvement in the reliability thereof.

It has been found that the characteristics of a switching network may be improved through the use of current-limiting diodes or constant-current devices in the shunt control circuits connected to the nodes of the switching circuit. By the use of current-limiting diodes in these control circuits, the voltages at the nodes required for priming and for lock-out are more readily and precisely regulated.

In a preferred embodiment of my invention, the current-limiting diodes may be field effect varistors such as are disclosed in application Serial No. 700,319 of E. I. Doucette et al., filed December 3, 1957. The field effect varistor is a two-terminal semiconductor device which has a characteristic exhibiting a low voltage region in which voltage increases only slightly for substantial increases of current, a section of changing voltage at substantially constant current, and a region of substantially constant high voltage. It further possesses in the constant-current region a relatively large and substantially constant alternating current impedance. This has the effect of reducing the shunt losses of transmission paths through the switching network.

In addition to improving the transmission characteristics of an electronic switching network, the use of field effect varistors as constant-current devices in accordance with this invention affords wider permissible tolerances in the design and production of the PNPN diodes employed as crosspoint switches and priming units. The use of the field effect varistors in a switching network accomplishes these results while permitting a relaxation of the margins on the potentials of the control signals used to operate the switching network.

The objects of this invention as set forth above are realized in one specific embodiment of this invention in which the path selection circuitry of a switching network having PNPN diodes as crosspoint switches comprises a field effect varistor in a shunt biasing circuit and a PNPN diode and a field effect varistor in series in a shunt control circuit connected to individual circuit nodes between the crosspoint switches. Path selection consists of two separate steps: "priming" the separate stages of the selected path through the shunt control circuits, and "marking" from a junctor within the network to break down the previously primed PNPN switches. Junctors, or bisectors, as matching stages in a switching network are well known in the art, one exemplary type being fully described in G. E. Jacoby et al. Patent 2,883,470, granted April 21, 1959. As employed in this specific embodiment of the invention, the junctor supplies the voltages for establishing and holding a connection, once a path has been primed.

Priming consists of changing the potentials of circuit nodes associated with selected bistable switches so they are in a proper condition for switching when the junctor signal is applied. The stages primed are so chosen that when a particular junctor is marked, the signal propogates through a unique group of PNPN switches to the terminals selected. Only "idle" nodes are primed. Circuitry is provided for shifting the node potential to prevent the priming of "busy" nodes which are included in a transmission path through the network. The priming potentials are applied only temporarily to the selected crosspoint switches and are removed as soon as a desired path is established. Once a connection is established it is maintained by holding potentials until it is desired to disconnect it.

It is imperative that no inadvertent connections are made to such a busy path while other connections are being set up. Accordingly, one aspect of this invention provides that the priming and biasing circuitry comprising the current-limiting devices and shunt PNPN diodes prevents the priming of the switches engaged in or directly connected to a busy path.

It is a feature of this invention that constant-current devices or current-limiting diodes be employed as bias control elements in a switching network having bistable switching stages.

In accordance with another feature of this invention, a switching network of bistable switches includes shunt control circuits, each including a constant-current device or a current-limiting diode and a PNPN diode, connected to circuit nodes between the bistable crosspoint switches.

It is another feature of this invention to provide a series arrangement of constant-current devices and PNPN diodes between two bias voltages to control automatically the potential of an associated switching network node in accordance with the impedance condition of crosspoint switches associated with the node.

More specifically, it is a feature of this invention to provide a network of interconnected PNPN crosspoint switches in series paths between network terminals, and to include in the network current-limiting devices between bias voltage sources and the switching path nodes with circuitry for priming selected idle nodes through associated constant-current devices and for breaking down crosspoint switches between primed idle nodes to establish a series transmission path.

In order to use all manufactured PNPN diodes it has been proposed that the diodes having high turn-on current capabilities be employed as crosspoint switches, while those having low current turn-on capabilities be employed in the shunt control paths of an electronic switching system. The PNPN diodes with low current turn-on capabilities are more sensitive to breakdown by transient voltages having magnitudes less than the normal breakdown voltage of the PNPN diodes. It has therefore been proposed that control voltages having ramp-shaped wave fronts be employed to avoid undesired energization of shunt-connected diodes. When field effect varistors are connected in series with the PNPN diodes, however, the resulting circuit has the advantage that normal sharply rising control pulses are more readily tolerated by the shunt-connected circuits.

A complete understanding of this invention and of these and various other features thereof may be gained from consideration of the following detailed description and the accompanying drawing, in which.

Figure 1:
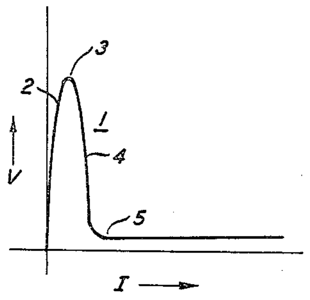
Fig. 1 shows the forward voltage-current characteristic curve of a PNPN semiconductor diode switch.

The voltage versus current characteristic curve 1 of a PNPN diode is plotted in Fig. 1. This curve 1 exhibits a high impedance region 2 short of breakdown, a voltage peak 3 corresponding to the breakdown voltage of the device, a negative impedance region 4 and a low impedance region 5 corresponding to the energized condition of the device.

Figure 2:
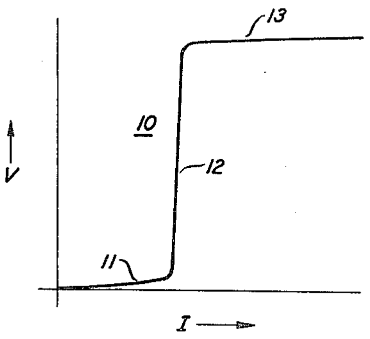
Fig. 2 shows a similar characteristic curve for a field effect varistor.

Fig. 2 is a plot of the forward voltage versus current characteristic curve 10 of a field effect varistor. The curve 10 contains a low resistance portion 11, a region 12 in which the current is substantially constant for a wide range of voltage and in which the resistance of the device therefore increases sharply with increasing voltage, and a breakdown region 13 of comparatively high resistance. In the present specification and claims the terms "constant-current device" and "current-limiting diode" both indicate a circuit component having a voltage-current characteristic which increases significantly in slope at a predetermined current level. While a steep characteristic region 12 such as that shown in Fig. 2 is to be preferred, many of the advantages of the present invention may be realized with circuits employing components having a somewhat less steeply rising portion of the voltage-current characteristic.

Figure 3:
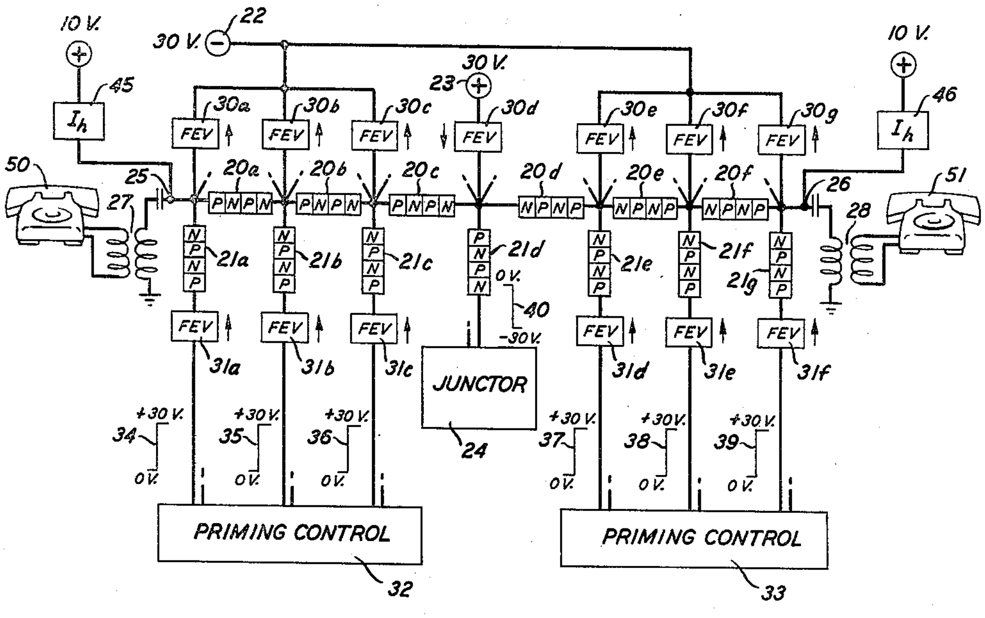
Fig. 3 depicts schematically a representative circuit in accordance with one specific embodiment of the invention.

The diagram of Fig. 3 represents a typical circuit for providing a talking path between two subscriber telephone sets 50 and 51 in accordance with the invention. In the figure, PNPN diodes 20 are arranged as crosspoint switches in series connection between the terminals 25 and 26. The telephone sets 50 and 51 are coupled through transformers 27 and 28 to the terminals 25 and 26, respectively. To the nodes adjacent each of the PNPN switches 20 there are connected a field effect varistor 30 and a second PNPN switch 21. Each switch 21, except switch **21*d*, also has in series with it another field effect varistor 31. Each of the field effect varistors is shown with an arrow alongside it indicating the normal direction of current for the device. Field effect varistors 30*a* through 30*c* and 30*e* through 30*g* are arranged in common connection to a source 22 of negative bias voltage. Field effect varistor 30*d* is connected to positive bias voltage source 23. Each series path containing a PNPN diode switch 21 and field effect varistor 31 is connected to priming control circuitry 32 or 33. PNPN switch 21*d* is connected from the series diode path directly to a junctor 24**. Interconnections to the remainder of the network of which the depicted circuit is representative are indicated but omitted for simplicity.

In describing the operation of the circuit of Fig. 3 it will be initially assumed that the series path between the telephone sets 50 and 51 is idle and that the switches 20 are in the high impedance state. With negligible current flowing through the varistors 30 they are in their low resistance state and apply substantially the full voltage from sources 22 or 23 to the associated path nodes. The establishment of a connection between the terminals 25 and 26 is initiated by applying the priming signals 34 through 39 from the priming control circuitry 32 and 33. Initially, PNPN switches **21*a* through 21*c* and 21*e* through 21*g* have approximately 60 volts applied across them which is sufficient to switch them to their low impedance state. The varistors 30 in the shunt biasing circuits are designed to have a constant current range at a lower current than varistors 31 in the shunt control circuits. Accordingly, when two varistors, such as 30***a* and 31*a*, are arranged in series between negative bias voltage source 22 and a positive 30-volt signal such as waveform 34, nearly all of the voltage is dropped across varistor 30*a*. This places the primed nodes of the series path at approximately +30 volts.

The connection is now completed by applying a −30-volt signal 40 from junctor 24 through PNPN switch 21*d* to the center node of the series path. Because of the impedance characteristic of varistor 30*d*, the potential of the center node is changed from approximately +30 volts to approximately −30 volts upon the application of the signal 40 and the resultant breakdown of PNPN switch 21*d*. The switches 20*c* and 20*d* now have approximately 60 volts applied across each of them. Therefore they break down, passing the voltage of waveform 40 to the succeeding PNPN switches 20*b* and 20*e*. Each of these now has substantially the full voltage difference of 60 volts applied across it and breaks down to extend the series of energized crosspoints. PNPN switches 20*a* and 20*f* finally break down in similar fashion and complete the path between the terminals 25 and 26. The completion of the path causes a surge of current which is detected in the priming control circuitry 32 and 33, whereupon the priming signals 34 through 39 and the junctor marking signal 40 are removed. The connection is now held by the positive 10 volts provided by the sources of hold current 45 and 46 and applied to terminals 25 and 26. An interruption of the connection is provided by momentarily reducing the holding potential to zero. The PNPN switches 20*a* through 20*f* are then returned to their high impedance condition.

When the talking path between the terminals 25 and 26 is busy the holding potential provided by circuits 45 and 46 maintains the potential of the path nodes near zero volts. As a result, any attempt to apply priming potentials 35 through 38 from the priming control source 32 or 33 to any of the path nodes is blocked by bistable switches 21*a*, 21*b*, 21*c*, 21*e*, 21*f* and 21*g* which have a potential less than the breakdown voltage applied across them. Thus, the inadvertent application of priming potentials to any busy path is prevented.

Figure 4:
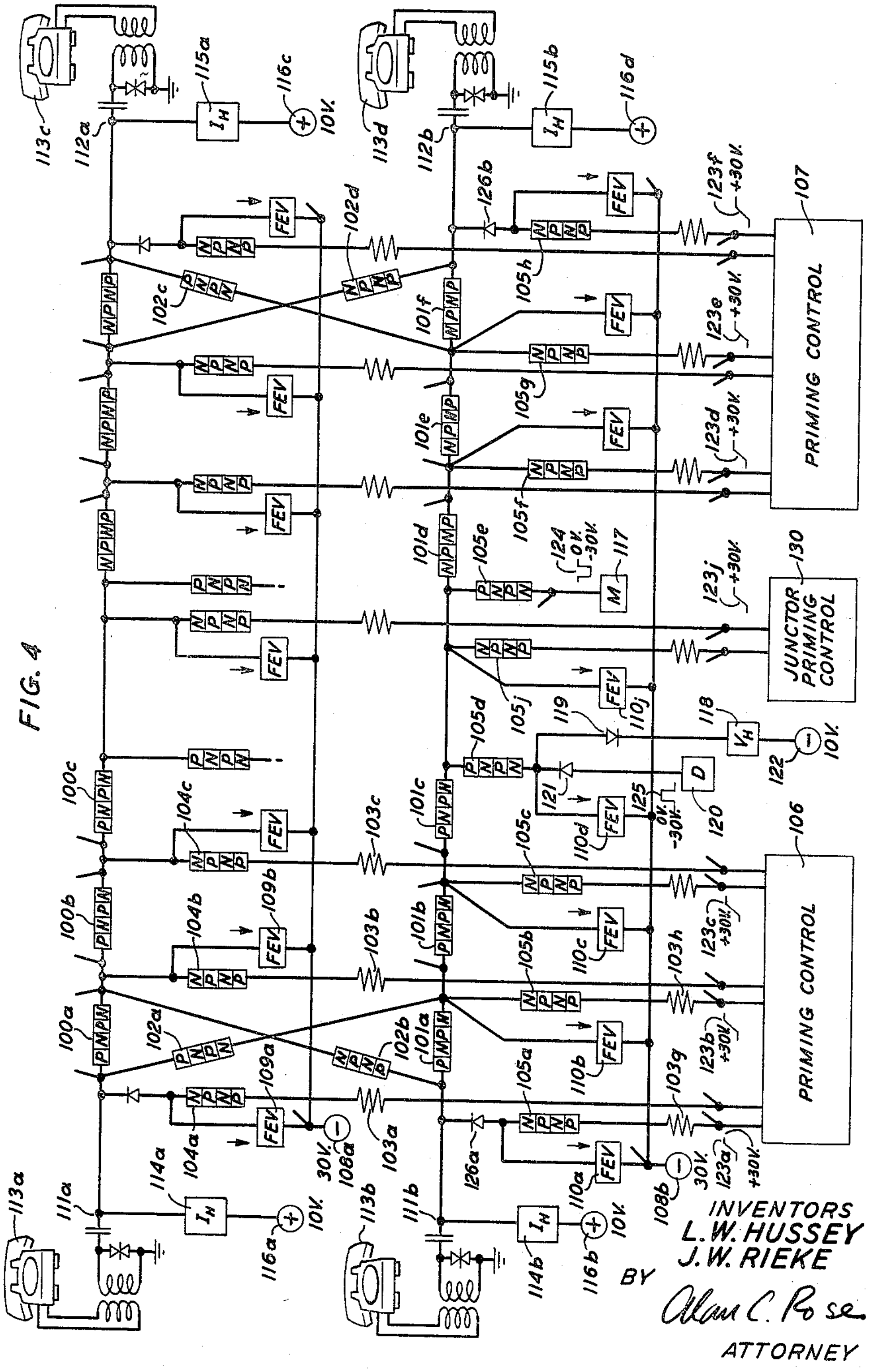
Fig. 4 is a combination block and schematic diagram of another specific embodiment of this invention.

Fig. 4 shows a circuit in accordance with another specific embodiment of the invention. In general, this circuit is a more elaborate version of the circuit of Fig. 3 and indicates how the principles of the invention are applicable to a larger switching network. The circuit of Fig. 4 includes two possible paths between terminals of a switching network, and represents only a portion of a complete network. Multiple connections to other paths through the network are indicated but the actual interconnections are omitted for the sake of simplicity. The circuit of Fig. 4 contains a plurality of PNPN switches 100, 101, and 102 connected at network crosspoints. The PNPN switches 100 are arranged in series in the upper path while the switches 101 similarly are connected in the lower path in the figure. Bistable switches 102 are shown cross-connecting the two paths at their outer ends. Connected to circuit nodes between adjacent crosspoint switches is a second plurality of shunt-connected PNPN switches 104 and 105 to some of which priming pulses from priming control circuitry 106, 107 and 130 may be applied. A bias from voltage sources 108 is applied to the same nodes through field effect varistors 109 and 110. The arrow adjacent each field effect varistor 109 or 110 indicates the normal direction of current through the varistor. A number of telephone subsets 113 are shown connected through coupling arrangements, as is known in the art, to network terminals 111 and 112. At each of the terminals 111 and 112 a holding current circuit 114 or 115 connects to a positive voltage source 116. A resistor 103 is connected in series with each of the shunt-connected PNPN diodes 104 and 105 associated with priming control circuitry 106 and 107 to limit the current in these diodes.

Junctor circuitry for establishing, holding and interrupting a transmission path through the network is shown connected to the center nodes of the lower path through shunt-connected PNPN switches 105*d* and 105*e*. The junctor priming control circuit 130 mentioned above is also connected to the center node, through PNPN diode 105*j*. The junctor circuitry includes a marking circuit 117 connected to the lower terminal of PNPN switch 105*e* to break down the cross-point switches. The circuitry further includes in common connection to the lower end of diode 105*d* a field effect varistor 110*d*; a latching, or holding, circuit 118 connected through a rectifier 119; and a latch disabling circuit 120 connected through a second rectifier 121. The latching circuit 118 is also connected to a source 122 of negative holding voltage. Similar connections from this junctor control circuitry are made to other network paths, as for example, the upper path in the figure. For simplicity, these connections are only indicated.

In the establishment of a particular path through the network, as for example, through the lower path comprising crosspoints 101, the priming step is performed by applying pulses 123*a* through 123*f*, and 123*j* from priming control circuitry 106, 107, and 130. These priming control signals are applied starting with pulse 123*j* at the center of the network and proceeding outwardly. Since the associated path nodes in the idle condition had been previously maintained at approximately −30 volts by field effect varistors 110, the shunt switches 105*a*, 105*b*, 105*c*, 105*f*, 105*g*, 105*h*, and 105*j* have approximately 60 volts applied across them. This is sufficient to break them down, after which the action of the associated varistors 110 shifts the potential of these primed nodes to +30 volts.

Marking pulse 124 is now applied from marking source 117 at the center of the network to break down PNPN switch 105*e* and shift the potential of the center node from +30 volts to −30 volts. This puts approximately 60 volts across each of the crosspoint switches 101*c* and 101*d*. These crosspoint switches then break down and pass the potential of marking pulse 124 outwardly to break down PNPN switches 101*a* and 101*b* on the left-hand side of the circuit, and PNPN switches 101*e* and 101*f* on the right-hand side of the circuit.

During the priming and marking steps the latch disabler circuit 120 applies a pulse 125 through rectifier 121 to the lower end of diode 105*d* to prevent this diode from breaking down. Once the selected crosspoint path is established, however, and its completion is detected by an increase of current in holding circuits 114*b* and 115*b*, pulse 125 and marking pulse 124 are removed, and the center node rises toward the positive 30 volts of the priming pulses. In a similar manner the voltage on the entire string of energized PNPN switches rises. PNPN switch 105*d* then breaks down, and the holding current flows through rectifier 119 to the latching circuit 118. Removal of the applied priming pulses 123 completes the connection between telephone sets 113*b* and 113*d*. This connection is thereafter maintained by latching circuit 118 and hold circuits 114*b* and 115*b*.

Cross-connections from any other path to a busy path are prevented by the potential shift of the path nodes to a voltage near zero. Thus no PNPN crosspoint switch which is connected to any busy path node can have more than about 30 volts across it. Since this voltage is less than the breakdown voltage, cross-connections to a busy path are prohibited. Priming to busy path nodes through shunt switches 105*b*, 105*c*, 105*f* or 105*g* is also prevented in the same fashion. The inclusion of rectifiers 126 in the series paths with PNPN switches 105*a* and 105*h*, however, permits the application of priming pulses 123*a* and 123*f* to associated path nodes. This arrangement is provided to permit the interruption of an established path as will now be explained.

To release a path, pulse 123*a* or 123*f* is applied to the associated PNPN switch 105*a* or 105*h*. The connection from the opposite terminal of the associated PNPN switch through a field effect varistor 110 to the −30 volts of source 108*b* permits breakdown of the pulsed PNPN switch. The applied pulse 123*a* or 123*f* then raises the potential of the entire transmission path to approximately +30 volts. Simultaneously, the marking pulse 124 is reapplied to break down diode 105*e*. This shifts the potential of the center node to −30 volts. Pulse 125 is reapplied from latch disabling circuit 120 to reverse-bias diode 105*d* and switch it to its high impedance state. Marking pulse 124 and latch disabling pulse 125 are then removed in succession. Since the junctor path for the current through the series crosspoint switches 101 has been thus eliminated, this current is interrupted and the crosspoint switches 101 also switch to their high impedance state. The priming pulse 123*a* or 123*f* which initiated the release operation is then removed and the path is thereafter completely idle.

The operation of the balance of the network is identical with the description of the control of a path through crosspoint switches 101 and similar paths may be provided through other interconnected diodes such as diodes 100 and 102. The voltages shown in the drawing to provide the proper operation of this circuit are typical and are not intended to limit the scope of the invention. In addition, it may be noted that other current-limiting devices may be employed instead of the field effect varistors shown in Figs. 3 and 4. For example, the cathode-plate characteristics of tetrodes or pentodes could be used for this purpose.

It is considered that the desirability of employing current-limiting diodes or constant-current devices in the circuits of Figs. 3 and 4 deserves emphasis at this point. In both systems, their use in the shunt biasing circuits permits wider tolerances in the bistable devices and the control signals, for example. The high alternating current impedance of the devices also improves the transmission properties of signal paths through the network. In addition, the use of the constant-current devices having different constant-current ranges in the bias and the control shunt circuits of Fig. 3 makes for simpler and more precise control of the priming action. Furthermore, more control current may be obtained in the bias and control circuits with less applied voltage when these constant-current devices are employed instead of resistors.

It is to be understood that the above-described arrangements are illustrative of the principles of the invention. Numerous other arrangements may be devised by those skilled in the art without departing from the spirit and scope of the invention.

What is claimed is:

1. An electronic switching network having first and second opposed sets of terminals comprising a plurality of PNPN diode switches interconnected to provide a plurality of alternative transmission paths between each terminal of said first set and each terminal of said second set, biasing means including field effect varistors connected to circuit nodes between said PNPN diode switches for establishing an initial potential at said circuit nodes, circuitry including a bistable device and current-limiting means also connected to each of said circuit nodes, means for applying signals to said last-mentioned circuitry for shifting said established potential at selected nodes, and means for triggering to their low-impedance region the PNPN diode switches associated with said selected nodes to establish a transmission path through said network.

2. An electronic switching network having a plurality of bistable devices interconnected to provide alternative series transmission paths between the ends of said network, a source of bias voltage, a plurality of constant-current devices connected between said bias voltage source and the circuit nodes of said bistable devices, control pulse means to cause said constant-current devices to change the potentials of selected nodes, and means for triggering to their low-impedance region those bistable devices associated with said selected nodes to establish a predetermined transmission path through said network.

3. An electronic switching network having opposing sets of terminals comprising a plurality of PNPN diode switches interconnected to provide alternative transmission paths between selected ones of said terminals, first means including a constant-current device connected to said switches for establishing an initial potential at the electrodes of said switches, second means including a bistable device also connected to said switches for changing certain of said electrodes from said initial potential to a second potential, and means for triggering to their low-impedance region those switches whose electrode potential has been so changed to establish a transmission path through said network.

4. A switching network as defined in claim 3 wherein said second means further includes a second constant-current device in series with said bistable device.

5. A switching network according to claim 4 wherein said bistable device comprises an additional PNPN switch.

6. A telephone switching network having opposite sets of terminals comprising a plurality of bistable crosspoint switches interconnected to form transmission paths between certain of said opposite terminals, first means including a constant-current device connected to the common connections of said crosspoint switches for applying a bias potential to said common connections, second means also connected to said common connections for applying a priming potential to selected ones of said common connections, means connected to said terminals to maintain a hold voltage at said common connections included in established transmission paths and prevent the application of said priming potential to these common connections, and means intermediate said network for triggering to their low-impedance region said bistable switches adjacent said primed common connections.

7. A switching network according to claim 6 wherein said second means comprises a PNPN diode switch associated with each of a plurality of said common connections.

8. A switching network according to claim 7 wherein said second means further comprises an additional constant-current device in series with each of a plurality of said PNPN switches.

9. A switching network according to claim 8 wherein said constant-current devices are field effect varistors.

10. An electronic switching network comprising a plurality of interconnected bistable devices each having low and high impedance states, bias means, constant-current impedance means connected between said bias means and the common points between adjacent bistable devices, and control means to cause selected bistable devices to change from said high impedance to said low impedance states, thereby establishing a low impedance path through said switching network.

11. An electronic switching network as set forth in claim 10 in which said control means includes a source of priming potentials and further constant-current impedance means between said source and said common points.

12. An electronic switching network as set forth in claim 11 wherein said constant-current impedance means comprise field effect varistors.

13. An electronic switching network as set forth in claim 10 in which said control means further includes second bistable semiconductor means to prevent breaking into an already established path during the establishment of another path through said network.

14. A telephone switching network comprising first and second pluralities of bistable devices, each having low and high impedance states, said first plurality interconnected to provide alternative transmission paths through said network, bias means, said second plurality connected to the circuit nodes of said first plurality devices, first constant-current impedance means connected between said nodes and said bias means, second constant-current impedance means connected in series with said second plurality devices, and control circuit means for selecting a particular idle path through said network and switching to the low-impedance state said first plurality devices of said selected path.

15. A telephone switching network according to claim 14 wherein said constant-current impedance means comprise field effect varistors.

16. A switching network as defined in claim 14 wherein said first and second constant-current means have constant-current regions at different current levels.

17. In a potential control circuit, an output circuit, a first constant-current device having a predetermined constant-current level connected between a reference potential terminal and said output circuit, a series circuit including a bistable device and a second constant-current device connected in series to said output circuit, said second constant-current device having a constant-current region at a different current level than said predetermined level, and means for applying control signals to said series circuit to switch said bistable device to the low impedance state.

18. An electronic switching network comprising a first plurality of PNPN diodes as crosspoint switches to form transmission paths through the network, a second plurality of PNPN diodes in shunt connection to nodes between adjacent crosspoint switches, a bias source, current-limiting diodes between said nodes and said bias source to control the potential of said nodes, another current-limiting diode connected to one of said second plurality of PNPN diodes to change the potential of an associated node of a busy path, and control means connected to said second plurality devices to establish, maintain and release said transmission paths.

19. An electronic switching network having first and second opposed sets of terminals comprising a plurality of PNPN diodes interconnected to provide a plurality of alternative transmission paths between each terminal of said first set and each terminal of said second set, biasing means including field effect varistors connected to circuit nodes between said PNPN diodes for establishing an initial potential at said circuit nodes, bistable circuitry including current-limiting means also connected to each of said circuit nodes, means for applying signals to said last-mentioned circuitry for shifting said established potential at selected nodes, and means for switching to their low-impedance state the PNPN diodes associated with said selected nodes to establish a transmission path through said network.

20. In a potential control circuit, an output circuit, a first constant-current device having a predetermined constant-current level connected between a reference potential terminal and said output circuit, a series circuit including a PNPN diode switch and a second constant-current device connected in series to said output circuit, said second constant-current device having a constant-current region at a different current level than said predetermined level, and means for applying control signals to said series circuit to trigger said diode switch to its low-impedance state.

21. In a communication switching network a first and a second PNPN diode switch connected in series in a transmission path, constant-current means connected to the point of connection between said first and second switches, means applying a bias potential to said constant-current means, a third PNPN diode switch also connected to said point of connection between said first and second switches, and means for applying priming potentials to said third switch.

22. In a communication switching network the combination set forth in claim 21 wherein said constant-current means comprises a field effect varistor.

23. In a communication switching network the combination set forth in claim 22 further comprising a second field effect varistor in series with said third PNPN diode switch and said priming means.

24. In combination, a first plurality of series-connected bistable devices; a plurality of shunt control circuits, including an additional plurality of bistable devices, connected to circuit nodes between said series-connected bistable devices; at least one of said shunt circuits including a rectifier having one terminal connected to one of said circuit nodes, one of said last-mentioned bistable devices being connected in series with, and to the other terminal of, said rectifier, and a source of biasing potential connected to the common connection between said rectifier and the associated bistable device; means for shifting the potential of nodes included in an established transmission through said first plurality of bistable devices; and means for applying a pulse to switch the bistable device in series with the rectifier to its low impedance state and break into the established transmission path.

No references cited.